United States Patent
Sterling

[11] 3,815,447
[45] June 11, 1974

[54] APPARATUS FOR REMOVING FOREIGN OBJECTS FROM TIRE TREADS

[76] Inventor: Remko C. Sterling, Clearbrook, Minn. 56634

[22] Filed: Apr. 7, 1972

[21] Appl. No.: 241,978

[52] U.S. Cl.................................................. 81/3 R
[51] Int. Cl..................................................... B25b
[58] Field of Search ......... 81/3 R, 15.2; 254/21, 25, 254/131; 30/169, 171; 15/236 R, 236 N; 294/26

[56] References Cited
UNITED STATES PATENTS

| 466,066 | 12/1891 | Sheldon | 254/25 |
| 1,202,120 | 10/1916 | Stuckel | 294/26 |
| 1,450,209 | 4/1923 | Hays | 81/15.2 |
| 2,484,948 | 10/1949 | Iafrate | 15/236 NO |
| 2,824,323 | 2/1958 | Tos et al. | 15/236 |
| 3,155,997 | 11/1964 | Gallagher | 15/236 R |

FOREIGN PATENTS OR APPLICATIONS 182,017   6/1922   Great Britain ........................ 294/26

*Primary Examiner*—James L. Jones, Jr.
*Attorney, Agent, or Firm*—Hamilton, Renner & Kenner

[57] ABSTRACT

An apparatus for removing foreign objects lodged in the tread portion of a tire which includes a blade member of uniform thickness that is secured to and extends outwardly obtusely from a handle, the end portion of the blade member having a transverse extension which terminates in a dull tip portion, whereby such apparatus conveniently permits the tip portion to be positioned relative to a foreign object lodged in a tire tread for the purpose of facilitating removal of the object.

7 Claims, 6 Drawing Figures

PATENTED JUN 11 1974　　　　　　　　　　　　　　　　　　3,815,447

APPARATUS FOR REMOVING FOREIGN OBJECTS FROM TIRE TREADS

BACKGROUND OF THE INVENTION

The present invention relates to an apparatus designed specifically for the easy and efficient removal of foreign objects such as stones, glass and the like from the tread portion of vehicle tires.

To my knowledge, no specific device has heretofore existed in the tire accessory field to effect the removal of foreign objects from the treads of vehicle tires. Therefore, resort has normally been made to the use of conventional tools of the type having a handle and some type of shaft extending therefrom to aid in engaging and dislodging such foreign objects to effect their removal. Typical tools so used include screwdrivers, ice picks and open end wrenches; however, such tools are generally ill-suited and cumbersome to use. Moreover, optimum use of such tools usually requires an approach or insertion along a line extending somewhat tangentially of the tire treads into a wheel-well area which generally is sufficiently close to the tire to severely limit the maneuverability of a tool of any appreciable length and often presents a difficult ingress, if any at all, for a person's hand. As a result, the removal of foreign objects from tire treads which is recognized as a significant maintenance operation for obtaining maximum life and minimum failures in tires is often done only to the limited extent convenient under the circumstances, or, perhaps more frequently, omitted entirely.

One tool used in the tire accessory field to dislodge valve stems is a device having a handle and a foot slightly offset therefrom. In general, the foot portion of this type of tool is bifurcated to form a jaw-like construction which is rounded at the point of departure of the furcations. Such a tool is designed to straddle the valve stem fitting during removal of the valve stem. Due to the design of the tool, however, it is not readily adaptable for efficient use in removing foreign objects from tire treads because neither the hand nor foot portions are of appropriate configuration.

Another type of prior art tool often pressed into service for removal of foreign objects in tire treads is tack or staple pulling devices of a variety of sizes and shapes. Characteristically these devices have a handle with a projecting blade which terminates in a point. The base of the blade normally has an offset which forms a heel. The tool is, of course, used by inserting the point beneath the flange or head of the tack and exerting a force on the handle so as to raise the point by pivoting it about the heel to withdraw the tack. However, this type of tool also exhibits many of the above-noted shortcomings and is therefore not readily adaptable for efficient or effective use.

SUMMARY OF THE INVENTION

It is therefore an object of the present invention to provide an apparatus designed in all respects especially for removing foreign objects from tires. Another object of the invention is to provide an apparatus in which the end portion of an obtusely extending blade has a transverse extension to permit facile removal of foreign objects from tire treads with a minimum possibility of damage to the tire tread or casing components. It is a further object to provide an apparatus, as above, wherein during use an operator's hand will normally be located axially of the confined area between the tire treads and wheel-well of vehicle, thereby facilitating access to the foreign object while minimizing possibilities of injuries to the operator.

It is still a further object of the invention to provide an apparatus for removing foreign objects from tires which is relatively noncomplex, efficient, convenient to use, easily assembled and can be economically fabricated.

In general, the invention relates to an apparatus having a handle and a secured, uniformly thick, obtusely extending blade which at the end portion thereof has a transverse extension terminating in a dull tip so that the apparatus may be used to remove foreign objects from tire treads.

One preferred embodiment of the present invention is described in detail without attempting to discuss all of the various modifications in which the invention might be embodied; the invention being measured by the appended claims and not by the details of the specifiation.

DESCRIPTION OF THE PREFERRED EMBODIMENT

Figure 1:
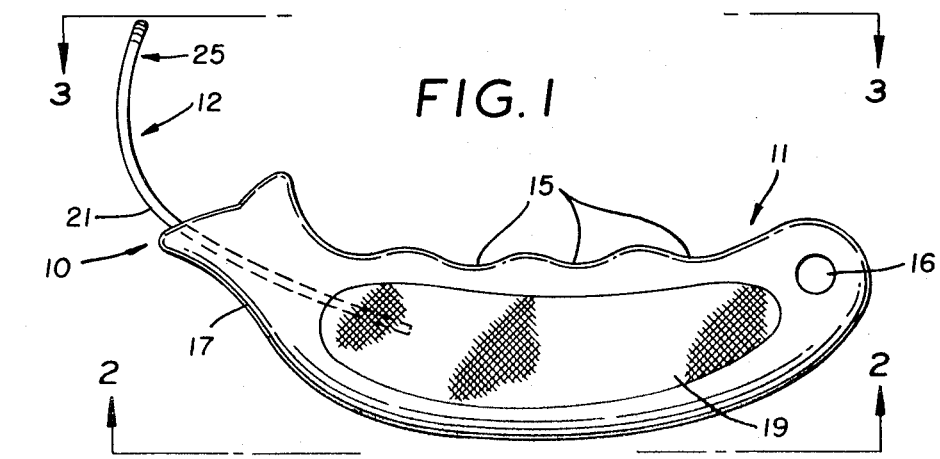
FIG. 1 is a side elevational view showng a preferred form of apparatus for removing foreign objects from tire treads according to the concepts of the present invention.

Referring to the drawings and particularly to FIG. 1 thereof, an apparatus for removing foreign objects lodged in the tread portion of a tire according to the concept of the present invention is indicated generally by the numeral 10. A handle, generally indicated by the numeral 11, has a blade means, generally indicated by the numeral 12, which is secured to handle 11 according to any one of several conventional ways designed to provide rigidity commensurate with a unitary article. As seen in FIG. 1, the handle is generally longitudinal in shape and blade means 11 extends outwardly from the longitudinal axis of the handle at an obtuse angle. The handle may be molded from any suitable plastic, fabricated from metal or constructed of any other suitable material. The blade means is preferably made of metal which may be stainless steel and preferably is of uniform thickness throughout.

Handle 11 may have a series of finger grooves 15 to facilitate manual gripping of the apparatus and a hole 16 may exist in the handle end opposite the blade so that the apparatus may be suspended during storage.

Figure 2:
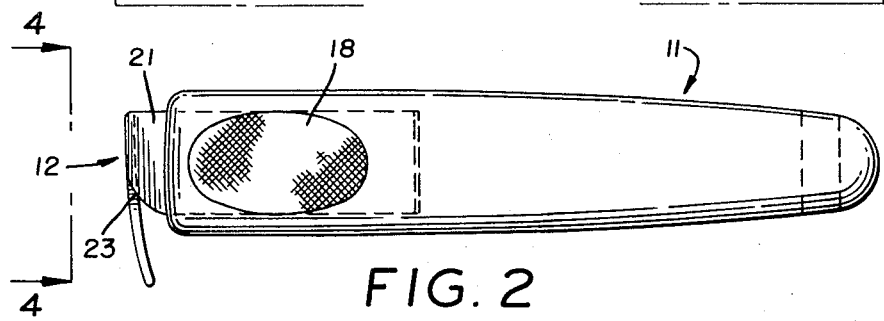
FIG. 2 is a bottom plan view of the apparatus, taken substantially along line 2—2 of FIG. 1, showing particularly the thumb grip portion of the handle.
Figure 3:
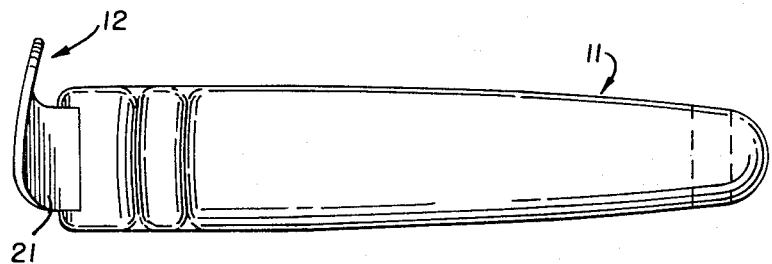
FIG. 3 is a top plan view of the apparatus, taken substantially along the line 3—3 of FIG. 1.
Figure 4:
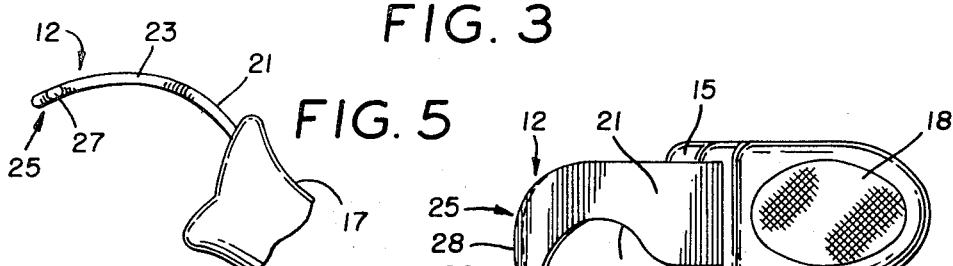
FIG. 4 is a front elevation, taken substantially on the line 4—4 of FIG. 2, showing particularly the configuration of the blade.

Handle 11 may also have a neck portion 17 which extends outwardly generally at a slight angle with respect to the longitudinal axis of the handle and preferably in the direction of the blade so as to insure a secure engagement between the handle and the blade. As seen in FIGS. 2 and 4, the bottom of neck portion 17 has a thumb grip 18 which may exist in the form of a rubber or plastic insert or simply be a knurled area. Similarly, the sides of handle 11 may have knurled areas 19 or other gripping surfaces or configurations to insure that a firm hold may be obtained.

Figure 5:
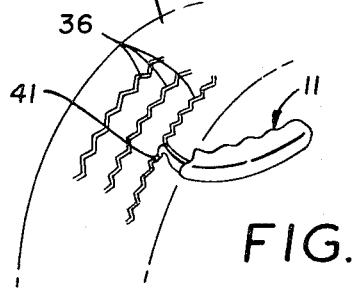
FIG. 5 is a fragmentary side elevation of the apparatus, taken substantially on the line 5—5 of FIG. 4 and presenting the opposite side of the blade from that depicted in FIG. 1.

The configuration of the blade is best seen in FIGS. 1, 4 and 5. Referring to FIGS. 4 and 5, base portion 21 extends obtusely outwardly from the longitudinal axis of the handle. The width of the blade base portion is generally substantial with respect to the width of the handle to impart strength as well as to resist twisting and the length of the blade base portion may extend only a short distance outwardly of neck portion 17 before commencement of a lateral recess 23. The blade portion along recess region 23 is generally curved until preferably the outermost part of region 23 forms approximately a right angle with the axis of handle 11. The shape of recess 23 is generally curvalinear and extends to approximately half the width of the base portion for most applications of the apparatus. Should the apparatus be used for heavy duty applications such as removing foreign objects lodged in the tire treads of large trucks, the depth of the recess need not be as great and furthermore the recess blade portion may be crimped to improve its strength.

The blade end portion, generally indicated by the numeral 25, preferably extends at an angle which is closer to being crosswise than to being parallel to the longitudinal handle axis in order to permit facile operation of the apparatus. A particular and preferred crosswise angle, that of a substantially right angle, is shown in FIG. 1. As shown in FIG. 4, blade end portion 25 has a transverse extension 26 which terminates in a tip 27. Generally, extension 26 has an arcual outer edge 28 which extends from the blade recess region and a concave inner edge 29 which extends from the curvalinear recess such that they form a tapered extension. Tip 27 as shown in FIGS. 4 and 5 is positioned slightly within the outermost transverse projection of blade end portion 25 and preferably is constructed in the form of a dull point, rounded or otherwise. Tip 27, blade end portion 25, blade recess region 23 and blade base 21 preferably have substantially the same thickness.

Figure 6:
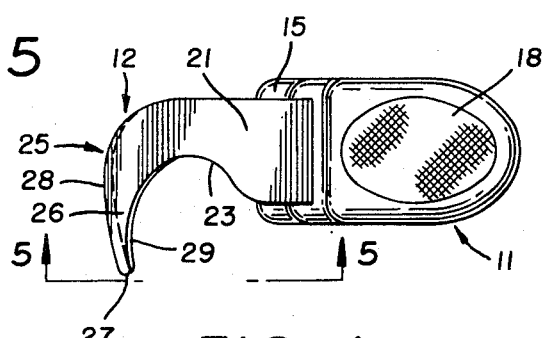
FIG. 6 is a perspective view of the apparatus of the present invention generally showing it positioned in conjunction with a tire for removing a foreign object from the tread portion thereof.

In order to extract a foreign object such as a stone 41 from between treads 36 of tire 35, an operator merely grasps handle 11 and inserts, as by sliding, tip portion 27 between the treads and beneath the stone. Since blade end portion 25 preferably extends in a direction transverse to the longitudinal axis of handle 11, apparatus 10 may be held an axial direction with respect to the tire treads as shown in FIG. 6. This feature, of course, permits an operator to use the apparatus in situations where the clearance between the vehicle tire treads and the wheel-well is small since the operator's hand will often be located axially of this confined area. Furthermore, the blade end portion may extend transversely of the handle in the direction shown or in an antipodal direction to accommodate either right or left-handed persons. Moreover, since edge 28 of end portion 25 is arcual, an operator need only twist the apparatus handle to remove the foreign object since edge 28 will act as a fulcrum locus. Due to the configuration of the blade, the apparatus conveniently may be used to dislodge foreign objects from numerous tire treads, regardless of tread design.

It can be seen that the above disclosed apparatus carries out the objects of the invention. Since various modifications in details, materials and arrangements of parts and in steps carried out are within the spirit of the invention herein disclosed and described, the scope of the invention should be limited solely by the scope of the attached claims.

What is claimed is:

1. An apparatus for removing foreign objects lodged in the tread portion of a tire comprising, a generally longitudinal handle, blade means secured to said handle and extending outwardly obtusely from said handle, said blade means having a uniform thickness throughout and a base portion of width substantially greater than the thickness thereof, an extension projecting generally transversely of said blade means proximate the end portion thereof and extending transversely of said handle, said extension terminating in a dull tip portion so that said tip portion may be inserted between the lodged foreign object and the tire for facilitating removal of the object.

2. Apparatus according to claim 1, wherein said tip is positioned within the outermost projection of the extension.

3. Apparatus according to claim 1, in which said extension is tapered.

4. Apparatus for removing foreign objects lodged in the tread portion of a tire comprising, a generally longitudinal handle, blade means secured to said handle and extending outwardly obtusely from said handle, said blade means having a uniform thickness throughout and a base portion of width substantially greater than the thickness thereof, a tapered transverse extension extending from the end portion of said blade means, said transverse extension having an arcual edge and a concave edge and terminating in a dull tip portion so that said tip portion may be inserted between the lodged foreign object and the tire for facilitating removal of the object.

5. Apparatus according to claim 4, wherein said blade means has a lateral recess in a region located outwardly of said base portion.

6. Apparatus according to claim 5, wherein said blade means is curvalinear along said recess region.

7. Apparatus according to claim 6, wherein the blade end portion extends crosswise with respect to the longitudinal axis of said handle.

* * * * *